Jan. 24, 1933.  C. SCHOFIELD  1,895,052
APPARATUS FOR SUPPLYING FIBROUS MATERIAL SUCH AS
COTTON DURING PREPARATION FOR SPINNING
Filed Dec. 28, 1931  3 Sheets-Sheet 1

Inventor:
Charles Schofield,
By Byrnes, Stebbins, Parmelee + Blenko
attys

Inventor:
Charles Schofield,
By Byrnes, Stebbins,
Parmelee & Blenko.
Attys.

Jan. 24, 1933. C. SCHOFIELD 1,895,052
APPARATUS FOR SUPPLYING FIBROUS MATERIAL SUCH AS
COTTON DURING PREPARATION FOR SPINNING
Filed Dec. 28, 1931 3 Sheets-Sheet 3

Inventor:
Charles Schofield,
By Byrnes, Stebbins, Parmelee & Blenko
attys.

UNITED STATES PATENT OFFICE

CHARLES SCHOFIELD, OF BOLTON, ENGLAND, ASSIGNOR TO DOBSON & BARLOW LIMITED, OF BOLTON, ENGLAND, A BRITISH COMPANY

APPARATUS FOR SUPPLYING FIBROUS MATERIAL SUCH AS COTTON DURING PREPARATION FOR SPINNING

Application filed December 28, 1931, Serial No. 583,496, and in Great Britain December 31, 1930.

This invention relates to apparatus for supplying fibrous material, such as cotton during preparation for spinning, of the type comprising a feed chamber having an inlet for receiving from a main supply conduit material to serve as a supply common to a plurality of outlets leading each to one of a plurality of branch conduits each for feeding a manipulating machine, feed regulating means comprising a control member that is responsive to the quantity of material in the feed chamber and/or in the branch conduits, and means operatively connecting the control member to a supply-varying device for the main conduit whereby said control member serves automatically to control the supply of material to the inlet of the feed chamber in accordance with the total requirements of all the manipulating machines fed therefrom. The fibrous material, e. g. cotton, may be fed along the main conduit from preliminary treating means, such as a hopper feeder, and the manipulating machines may each be subsequent treating means, such as an opener. Alternatively, the material, e. g. cotton, may be supplied by the main conduit to hopper feeders constituting manipulating machines.

The present invention has for one of its objects to provide an improved construction of apparatus of the type described so arranged that the supply of material to two or more subsequent machines from a main supply conduit may be maintained in spite of variations in demand by the individual subsequent machines.

According to a feature of the invention, apparatus of the type described is characterized in that distributing means is arranged in the feed chamber between the said outlets leading to the branch conduits, for example at the junction of two branch conduits, to maintain the material in the chamber distributed among said outlets. This arrangement equalizes the supply of material to the various branch conduits from the feed chamber and ensures that, if the supply to one branch conduit is too fast so that it becomes choked, material can still be supplied to one or more other branch conduits.

According to another feature of the invention, apparatus of the type described is characterized in that the control member is situated in the feed chamber and is constituted by a balance plate arranged between the said outlets leading to the branch conduits, which plate can be shifted, for example vertically, from its normal position by an abnormal accumulation of material in the feed chamber and/or in the branch conduits, and serves to distribute the material among said outlets and, when so shifted, serves to diminish or stop the supply of material to the inlet. In this construction the control member itself constitutes distributing means for distributing material to the branch conduits.

The distributing means may comprise, according to another feature of the invention, two feed rolls spaced apart about the control member, between which rolls the material is fed to the control member, which feed rolls are rotated in opposite directions and serve to feed the material in opposite directions over the control member to the outlets, one at each side of the latter.

According to a further feature of the invention the control member is a balanced tray over which the material normally passes to the outlets, which tray can be shifted from its normal position by an abnormal accumulation of the material in the chamber, and, when so shifted, serves to diminish or stop the supply of material to the inlet.

Other features of the invention described hereinafter are concerned with the construction of the control member and means for balancing the same.

One embodiment of the invention is diagrammatically illustrated by way of example in the accompanying drawings, wherein:—

Like reference characters designate like parts throughout the several views.

Figure 1:
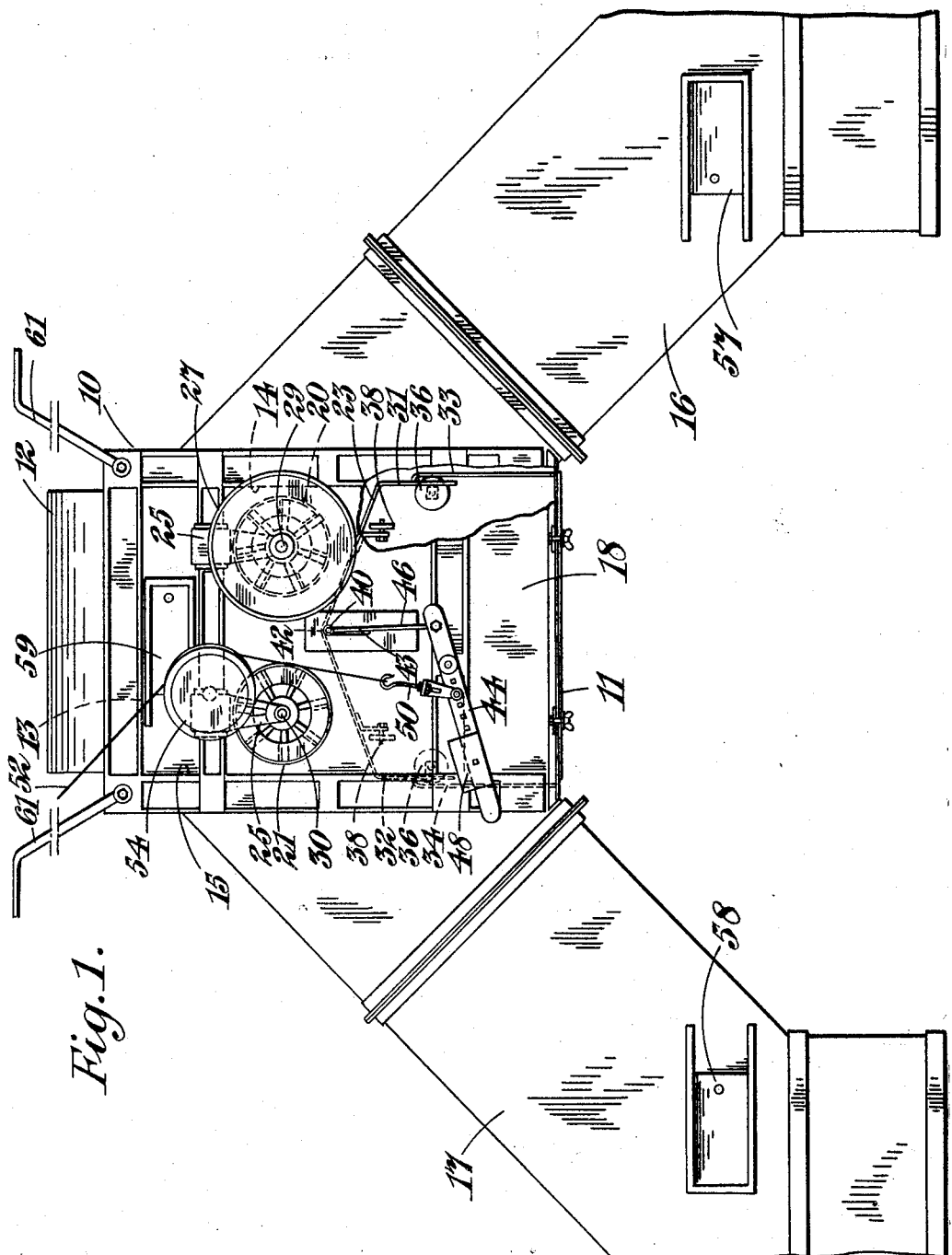
Figure 1 is a side elevation of a feed chamber shown partly broken away and having branch conduits leading therefrom.
Figure 2:
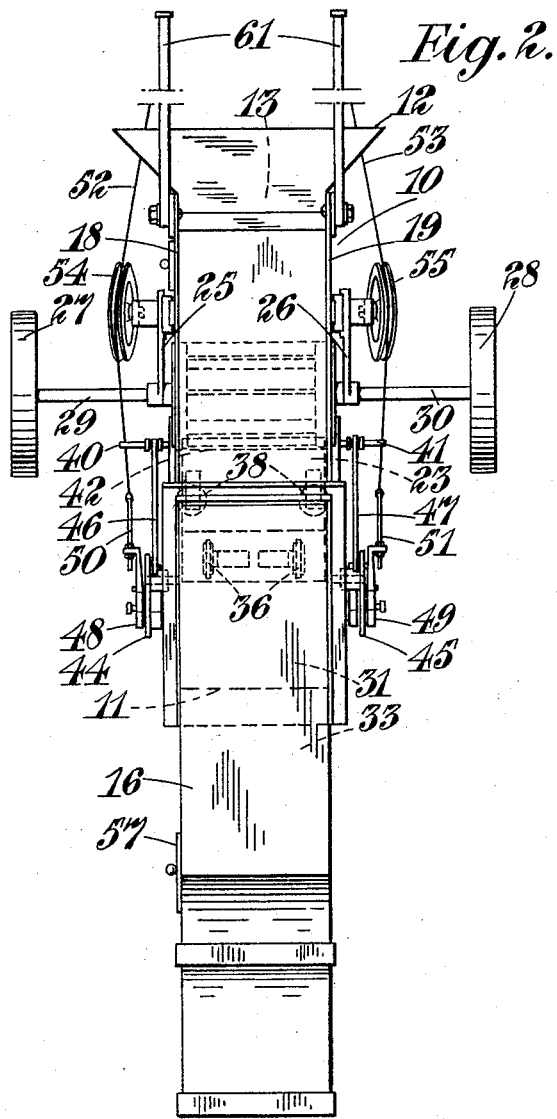
Figure 2 is an end elevation thereof as viewed from the right hand of Figure 1.
Figure 3:
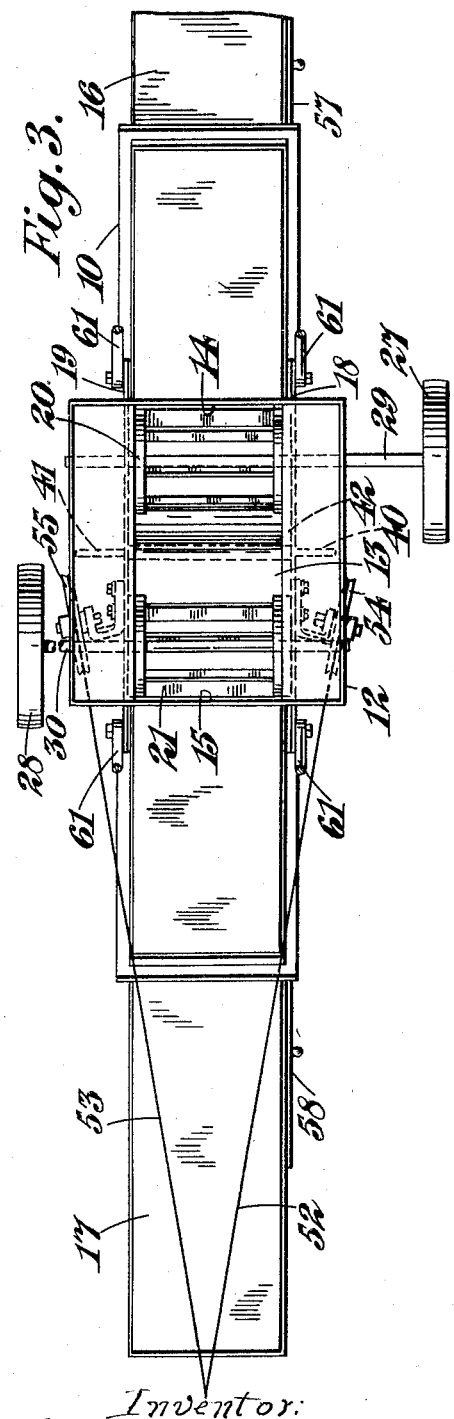
Figure 3 is a plan view of the same.

Referring first to Figures 1 to 3, a feed chamber, designated generally 10, of rectangular cross-section has a bottom wall 11 which is normally closed, but is formed or provided with a door for emptying the chamber. A mouth-piece 12 opens through an inlet 13 into the top of the chamber, and two outlets 14, 15, one in each end wall, open respectively into two branch conduits 16, 17 which slant downwards at a convenient angle, say 45° from the outlets. The inlets and outlets are each substantially as large as the respective walls of the chamber through which they open, and the mouth-piece 12 is flared so that its side walls slope outwards and overhang the two side walls 18, 19 of the chamber and tend to prevent material from falling on to parts described hereinafter mounted thereon.

Distributing means comprises a balance tray 23 and two bladed feed rolls 20, 21 arranged in the chamber to maintain the material fed into it distributed among the outlets. These feed rolls, which are situated above the tray, extend across the feed chamber from side to side and are spaced apart so that fibrous material fed to the inlet 13 will fall between them on to the tray which constitutes the control member aforesaid. These feed rolls 20, 21 are journalled each in a pair of brackets 25, 26 mounted outside the feed chamber on the side walls 18, 19, and are driven in opposite directions by pulleys 27, 28 respectively, mounted on shafts 29, 30 at opposite sides of the chamber. The feed rolls preferably lie below the inlet 13 with the lowest part of their peripheries at or near the middle of the chamber as to its height.

The tray 23 has the form of a wide inverted V, and is mounted to move vertically between the outlets 14, 15 towards which the two limbs or sides of the V slope. The outer end of each limb of the V has a depending skirt 31, 32, respectively, which lie each adjacent to an upstanding partition wall 33, 34, respectively, each closing the lower part of the adjacent outlet. Each skirt is slotted and carries two guide rollers 36 which extend each through a slot and run on the inner face of the adjacent partition wall. Each limb of the V-shaped tray also carries on its underside two guide rollers 38 arranged to run each on an inner face of a side wall 18 or 19 of the chamber 10.

Pivots 40, 41 are provided on the tray at the apex of the V. These pivots may be constituted by the ends of a rod 42 supporting the tray at the underside of its apex, and extend through vertical slots 43 in the side walls of the feed chamber. Two balanced levers 44, 45 fulcrumed on the side walls 18, 19, respectively, have one arm pivotally attached by a rod 46, 47, respectively, each to a said pivot and have a weight 48, 49 adjustable along the other arm. On the weighted arm each lever adjustably carries a hook 50, 51, respectively, connected to a wire 52, 53, respectively, or other flexible tie, which pass for the purpose described hereinafter, each over a guide pulley 54, 55 journalled on a side wall of the feed chamber. Cleaning doors may be provided in the branch conduits as shown at 57, 58 and in the upper part of the feed chamber as shown at 59.

Figure 4:
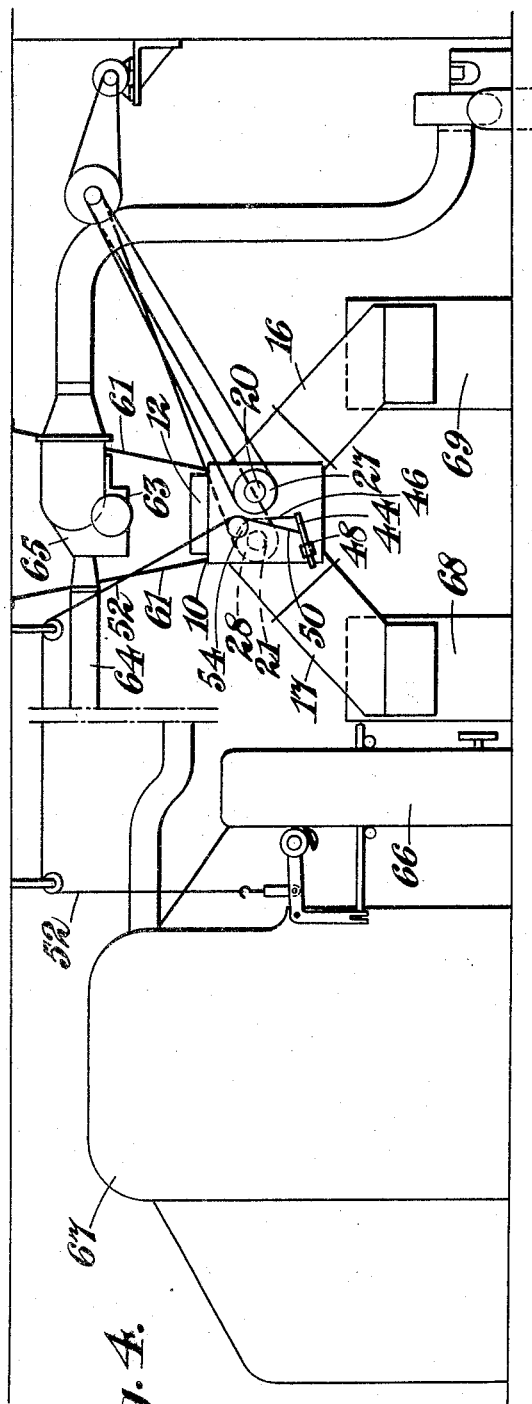
Figure 4 is an elevation of plant partly broken away comprising the feed apparatus shown in Figures 1 to 3, but on a scale smaller than that of those figures.

As shown in Figure 4, the feed chamber 10 may be supported from the ground or be suspended in any convenient manner, as by hangers 61, from an overhead structure, so that the mouth-piece 12 is situated vertically below the outlet 63 of a main supply conduit 64 or a part thereof which may be a pneumatic delivery box 65 of known construction. In some cases however the main supply conduit may open directly into the feed chamber. This conduit or preliminary treating means associated therewith is provided at any convenient situation with a supply-varying device 66 which when moved or permitted to move by the balanced levers 44, 45 operates the same to regulate the feed. As illustrated the device 66 is a change-speed gear associated with a hopper feeder 67.

The invention is particularly applicable to feeding cotton during preparation for spinning although it is not restricted thereto. When so applied, the main conduit 64 may be fed with preliminarily treated cotton by the hopper feeder 67. This hopper feeder may for example deliver the cotton to a porcupine opener from which it may be conveyed pneumatically or mechanically to vertical and/or horizontal openers, either single or double, along a gridded dust trunk and thence to the pneumatic delivery box 65 which delivers the cotton to the mouth-piece 12. The cotton then passes by way of the branch conduits 16, 17 to manipulating machines of any convenient kind, such as horizontal openers 68, 69. Alternatively, the cotton may be supplied by the branch conduits to hopper feeders which may feed preliminary treating means, such as vertical and/or horizontal openers.

When the supply of cotton or other material is normal the tray 23 is situated in its upper position shown in Figure 1 with its pivots 40, 41 at the top of the slots 43. On being received into the chamber 10 the material meets the feed rolls 20, 21 rotating in opposite directions, is scattered about in the chamber by their blades, and is distributed by the tray through the outlets 14, 15 into the branch conduits 16, 17. This is because, as viewed in side elevation (see Figure 1) a passage of substantially inverted T shape is formed by the tray and feed rolls along which the material passes to the two outlets in opposite directions along the sloping parts of the tray. As the conveyance of the material continues the branch conduits gradually become full until no more material can be received by them. The feed rolls 20, 21 continue to rotate however, and the material which continues to be fed into the mouth-piece 12 accumulates and becomes closely packed below each feed roll 20, 21 and exerts sufficient pressure on the tray 23 to cause it to descend as far as the length of the slots 43 permit. When thus depressed the wire control motion comprising the wires 52, 53 operates and actuates the feed-varying device 66 at the preliminary feeding machine 67 so as to reduce the quantity of material being fed to the mouth-piece 12 or to entirely stop the feed. In this way the material ceases to be delivered into the branch conduits 16, 17 until some of the material in the latter has been used and the pressure in the branch conduits is relieved sufficiently to allow the tray 23 to ascend to its normal upper position under the action of the weights 48, 49 on the levers 44, 45. Simultaneously with this movement of the levers 44, 45 the normal rate of feed of the preliminary feeding machine is resumed owing to the operation of the wire control 52, 53 and the material will be fed at the normal rate into the mouth-piece 12 and the feed chamber 10 and thence into the branch conduits 16, 17.

If one of the branch conduits 16, 17 becomes full before the other, material which is being passed underneath the feed roll at the inlet of the conduit will be carried round by the feed roll and, instead of being left in the branch conduit, will be thrown away from its inlet end, that is to say over the top of the respective feed roll towards the companion feed roll at the entrance to the other branch conduit which is not yet full. This material which is thrown backwards is thus received by the other feed roll and passed into the second branch conduit (which is not yet full) in the manner described above. It will thus be appreciated that the balance tray 23, which assists in distributing material to the outlets 14, 15, does not operate to regulate the feed until both branch conduits 16, 17 are full, so than an abundant supply of material to both branch conduits is maintained under varying conditions of operation of the subsequent treating means. Consequently, even if the demand of the subsequent machines on the material to be used by them varies the supply of such material is maintained under widely varying conditions of operation. Moreover, the entire combination of machines including the preliminarily treating means, the manipulation machines and any intermediate machines that may be provided is automatically controlled from the one end of the plant to the other.

If the feed rolls 20, 21 are omitted, as they may be in certain cases, the balance tray 23 will still function to distribute the material to the outlets by virtue of its inverted V shape, and will also control the supply of material to the feed chamber, but the described arrangement comprising the feed rolls is preferred.

Although the invention has been described with reference to a particular arrangement of machines, it is to be understood that it may be applied to various other combinations of machines for the purpose of affording a regular and continuous feed to two or more subsequent machines, whereby the handling of the material is obviated.

Various modifications may be made in the details of construction described above without departing from the scope of the invention as defined by the claims.

I claim:—

1. Apparatus for providing a regulated supply of fibrous material, comprising a feed chamber having an inlet for receiving from a main supply conduit material to serve as a supply common to a plurality of outlets leading each to one of a plurality of branch conduits each for feeding a manipulating machine, feed regulating means comprising a control member that is responsive to the quantity of material in the feed chamber and/or in the branch conduits, and means operatively connecting the control member to a supply-varying device for the main conduit whereby said control member serves automatically to control the supply of material to the inlet of the feed chamber in accordance with the total requirements of all the manipulating machines fed therefrom, characterized in that the control member is situated within the feed chamber and is constituted by a balance plate arranged between the said outlets leading to the branch conduits, which plate can be shifted from its normal position by an abnormal accumulation of material in the feed chamber and/or in the branch conduits, and serves to distribute the material among said outlets, and, when so shifted, serves to diminish or stop the supply of material to the inlet.

2. Apparatus according to claim 1, wherein a tray constituting the control member has the form of a wide inverted V mounted to move vertically between two outlets towards which the two sides of the inverted V respectively slope.

3. Apparatus for automatically regulating the supply of cotton or like fibrous material to a plurality of manipulating machines, comprising in combination a feed chamber having an inlet for receiving from a main supply conduit material to serve as a supply common to a plurality of outlets leading each to one of a plurality of branch conduits each for feeding one of said manipulating machines, a feeler plate in said chamber responsive to the quantity of material in the latter, and means operatively connecting the feeler plate to a supply-varying device for the main conduit, which feeler plate constitutes the bottom of, and is vertically movable in the feed chamber, and carries the material in the latter and is so formed that the material can slide down it to the said outlets.

4. Apparatus for providing a regulated supply of fibrous material, comprising a feed chamber having an inlet for receiving from a main supply conduit material to serve as a supply common to a plurality of outlets leading each to one of a plurality of branch conduits each for feeding a manipulating machine, feed regulating means comprising a control member that is responsive to the quantity of material in the feed chamber and/or in the branch conduits, means operatively connecting the control member to a supply-varying device for the main conduit whereby said control member serves automatically to control the supply of material to the inlet of the feed chamber in accordance with the total requirements of all the manipulating machines fed therefrom, and distributing means arranged in the feed chamber between the said outlets leading to the branch conduits to maintain the material therein distributing among said outlets, which distributing means comprises two feed rolls mounted spaced apart above the control member, between which rolls the material is fed to the control member, which feed rolls are rotated in opposite directions and serve to feed the material in opposite directions over the control member to the outlets, one at each side of the latter, for the purpose described.

5. Apparatus according to claim 1, wherein the feed chamber has two vertical slots, one in each of two opposite walls thereof, two pivot pins on said balance plate extending through said slots, and said means operatively connecting the balance plate to the said supply-varying device comprises two balanced levers that are arranged at opposite sides of the feed chamber and support said pivot pins, and flexible ties connected to said levers.

6. Apparatus according to claim 1, wherein a tray constituting the control member has the form of a wide inverted V mounted to move vertically between two outlets towards which the two sides of the inverted V respectively slope, which tray has at the ends of the V two depending skirts that lie each adjacent to the wall of the chamber below an outlet, and serve to guide the tray in the chamber.

7. Apparatus according to claim 1, wherein a tray constituting the control member has the form of a wide inverted V mounted to move vertically between two outlets towards which the two sides of the inverted V respectively slope, which tray has at the ends of the V two depending skirts that lie each adjacent to the wall of the chamber below an outlet, and guide rollers carried by said tray and arranged to run on walls of the chamber.

8. Apparatus for automatically regulating the supply of cotton or like fibrous material to a plurality of manipulating machines, comprising in combination a feed chamber having an inlet for receiving from a main supply conduit, material to serve as a supply common to a plurality of outlets leading each to one of a plurality of branch conduits each for feeding one of said manipulating machines, which feed chamber has two vertical slots, one in each of two opposite walls thereof, a feeler plate in said chamber responsive to the quantity of material in the latter, which feeler plate constitutes the bottom of said chamber and has a tray having the form of a wide inverted V mounted to move vertically between two outlets towards which the two sides of the inverted V respectively slope, two pivot pins on said tray extending through said slots, and means operatively connecting said tray to a supply-varying device for the main conduit, which means comprises two balanced levers that are arranged at opposite sides of the feed chamber, and support said pivot pins, and flexible ties connecting said levers to the supply-varying device.

In testimony whereof I affix my signature.

CHARLES SCHOFIELD.